July 9, 1935.  C. F. HANSCOM  2,007,680
DIRECTION INDICATING HAND FOR BAROMETERS
Filed March 27, 1933
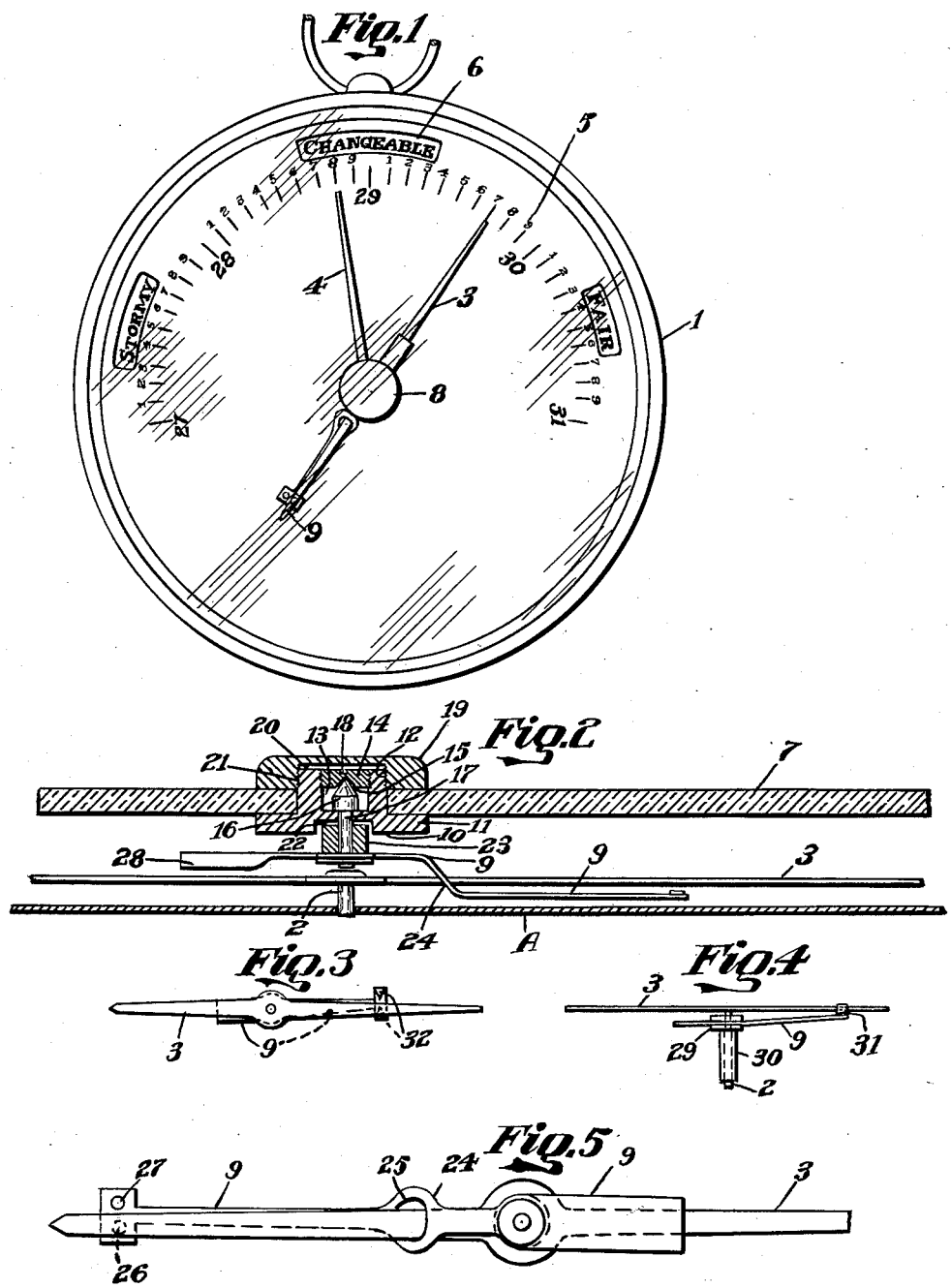
Inventor
Clinton F. Hanscom
By Ellis Spear Jr
Attorney Patented July 9, 1935

2,007,680

UNITED STATES PATENT OFFICE 2,007,680

DIRECTION INDICATING HAND FOR BAROMETERS

Clinton F. Hanscom, East Walpole, Mass.

Application March 27, 1933, Serial No. 662,959

11 Claims. (Cl. 116—129)

My invention relates to an improvement in barometers or like instruments and consists of a supplementary hand that will indicate the direction of movement of the indicating hand.

Although my invention may be applied to any instrument where the directional movement of the main indicating hand is important, its use in barometers is so typical that I confine my description and drawing to such use.

It has long been recognized that without some adjustable marker no reading of the barometer would be simple or accurate. Accordingly, an adjustable hand has customarily been provided that could be set to coincide with a position of the indicating hand. Then, whenever the hand moves the movement may be read in relation to the fixed hand.

The barometers, with the set hands, cannot always be accurately read. This is true because the indicating hand may have moved an appreciable distance from the set hand and started to move in the opposite direction. The observer will see a change in position of the indicator hand in relation to the set hand, but there will be no indication of the reversal in its movement and the significant fact that the pressure has changed will not be observed. Accordingly, unless the set arm is readjusted frequently, accurate readings can not be assured.

I solve this problem by providing another hand which is not influenced by the pressure directly but is moved freely by the indicating hand and carried with it. The means used to engage with the main hand are spaced so that movement of the indicating or main hand will not immediately move this hand. Between these means, which in practice are either turned up portions of the edge of the hand, or an aperture in the direction indicating hand through which the main hand extends, I provide suitable direction indicators such as arrows or colored warnings or signs. Because of the space between the ears there will be a lag between the time the indicator or pressure hand moves and the time it engages the turned up portions or ears during which the indicator hand will cover one direction sign and will reveal the other, thereby permitting easy and accurate reading of the barometer regardless of whether the set arm has been readjusted or not. Though obviously it is convenient to know how far the barometer has risen or fallen, the essential fact to know is in what direction the indicator hand is moving at any particular moment, therefore, the set hand may be dispensed with if desired.

The advantages of my invention are obvious. It permits accurate reading of a barometer at any time and it does away with the necessity of an adjustable set hand which must be frequently reset to be of any utility in reading a barometer.

In the drawing I have shown and in the specification described an embodiment of my invention. Throughout the specification and drawing like reference numerals are used to designate the corresponding parts, and in the drawing:

Fig. 1 is a front view of a barometer showing my new arm revealing the true direction of the indicator hand though according to the set hand the opposite conclusion would be reached by an observer.

Fig. 2 is an enlarged view partly in cross section showing how my new arm is mounted.

Fig. 3 shows a modified form of my direction indicating hand.

Fig. 4 is a side view of the form shown in Fig. 3, and

Fig. 5 is an enlarged view of the direction indicating hand and pressure hand shown in Fig. 1.

The usual barometer 1 has a spindle 2 through its face A to the interior of the barometer (not shown). The spindle 2 carries the indicating or pressure hand 3 that it may be read in relation to the set hand 4 and the scale markings 5 and other markings such as the verbal guides as at 6.

For the face of the barometer I use the usual transparent cover 7 in the centre of which is the support 8 for the set hand 4 and my new direction indicating hand 9.

The support 8 is shown in Fig. 2. It consists of a lower portion 10 flanged as at 11 and screw threaded as at 12. Within the lower portion 10 there is a circular recess 13 which is screw threaded to receive the plug 14. The plug 14 is shaped as at 15 to receive the bearing 16 of the shaft 17. The plug 14 is slotted as at 18 so that it may be adjusted to hold the shaft 17 securely yet permit its free rotative movement. A cap piece 19 is formed with a circular recess 20 which is screw threaded as at 21 so that the two pieces 19 and 10 may be screwed together securely yet permit the support 8 to be manually adjusted when it is used to carry the set arm 4 which may be secured to the lower portion 10. In such use, the support may be formed as a knob that it may be more easily turned. The member 8 has a central aperture 22 to receive the shaft 17 which carries a support 23 and the direction indicating hand 9.

The hand 9 is formed to straddle the main indicator hand 3 as at 24. This is done by forming the hand 9 with a sufficient aperture 25 so that movement of the hand 3 will not affect the hand 9 until the hand 9 has covered one direction sign revealing the other sign which will appear in trailing position to denote the true direction of movement of the pressure hand 3. At the end of the hand 9 are placed colored discs or other suitable signs or warnings. In practice, I use a blue disc 26 to indicate a rising barometer and a red disc 27 to indicate a falling barometer. In practice, barometers are frequently provided with two separate charts which instruct the observer of the significance of the position of the pressure hand 3 at every point, whether the hand is rising or falling. I contemplate the use of any suitable color scheme and will color the chart similarly with the corresponding direction sign on the hand 9. Thus, for example, if the atmospheric pressure is decreasing, the red disc 27 will appear and reference to the red chart will permit the observer at a glance to forecast the weather accurately.

The hand 9 is counterweighted at its other end as at 28 which ensures its perfect balance. Thus counterweighted, the hand 3 is able to carry the hand 9 without any interference with its efficiency.

The hand 9 may be mounted so that the colored discs will be either near one end or the other of the hand 3. The use of the set hand 4 makes it desirable to have the direction indicator 9 positioned near the rear of the indicator or pressure hand 3. Thus positioned, there is no chance that the set hand 4 will obstruct the observer's vision.

In Figs. 3 and 4 I have shown a modified form of my direction indicating hand. This is mounted freely on the shaft 2 by a collar 29 on a separate tube support 30 and has at its outer end upturned portions or ears 31. Between the ears 31 are positioned arrows 32 which are pointed towards each other as is shown in Fig. 3. The ears are spaced apart sufficiently so that as the hand 3 engages one of the ears 31 it will reveal an arrow or pointer clearly indicating the direction of the movement of the hand 3. This form of sign may be used instead of the form shown in Fig. 1. If so used, however, it must be mounted near the front of the hand 3 or the arrows will have to be pointed in opposite directions. These arrows may be colored and obviously any form of sign or color may be used with either hand.

Though I have shown two forms as merely illustrative of my invention I do not mean to be limited thereby as obviously changes and modifications may be made in my invention.

What I therefore claim and desire to secure by Letters Patent is:

1. In a gauge, a scale, a pressure indicator hand adapted to move over said scale and means adapted to denote the direction of movement of said hand, said means comprising a direction indicator mounted in said gauge independently of said pressure indicator hand, said direction indicator including spaced members engageable with said pressure indicator hand and each provided with a direction sign, said pressure indicator hand upon reversing its direction of travel over said scale traversing said direction indicator between said spaced members and thereby covering one sign and uncovering the other sign so as to reveal the direction of travel of said indicator hand.

2. In a pressure gauge, a pressure indicating hand influenced by pressure, means to denote the direction of movement of said hand including a direction indicating hand mounted in said gauge independently of said pressure indicating hand, said direction indicating hand including means to engage with said pressure indicating hand, and signs to denote the direction of movement of said pressure indicating hand, said means being alternately engageable with said pressure indicating hand according to its direction of travel so as to be carried thereby, and said signs being so disposed on said direction indicating hand as alternately to be covered and uncovered by said pressure indicating hand according to its direction of travel.

3. In a gauge including a pressure indicating hand, means to denote the direction of movement of said hand comprising a direction indicating hand freely mounted in said casing and concentric with said pressure indicating hand, said direction indicating hand including portions to be engaged by said pressure indicating hand whereby said direction indicating hand is carried with said pressure indicating hand, said direction indicating hand including signs to denote direction of the travel of said pressure indicating hand, and said pressure indicating hand engaging portions being so disposed as to permit the pressure indicating hand when engaged with one of said portions to conceal one of said signs and to disclose the other thus revealing the direction of movement of said pressure indicating hand.

4. In a pressure gauge including a casing and a cover, means for determining the direction of pressure fluctuation, said means including a pressure influenced hand mounted in said casing, a direction indicator independently mounted in said cover, said direction indicator carrying opposed signs denoting direction of movement of said pressure influenced hand, one of which is adapted to be covered by said pressure influenced hand as it travels in one direction, said pressure influenced hand as it reverses its direction of travel covering the exposed sign and uncovering the other sign, and means whereby said direction indicator travels with said pressure influenced hand.

5. In a pressure gauge, means for determining the direction of pressure fluctuation, said means including a pressure influenced hand, and a direction indicator movable independently of said pressure influenced hand, upturned portions on said direction indicator, one of which is adapted to be engaged by said pressure influenced hand as it travels in one direction and the other to be similarly engaged as it travels in the opposite direction, whereby said direction indicator is carried by said pressure hand, signs denoting direction of movement carried by said direction indicator between said upturned portions, said portions being spaced to permit said pressure influenced hand to uncover one and cover the other of said signs before engaging the opposed upturned portion, said uncovered sign indicating the direction of travel of said pressure influenced hand.

6. In a barometer including a casing, a scale bearing member and a transparent cover, means for determining the direction of pressure fluctuation, said means including a pressure influenced hand and a direction indicating hand mounted independently of said pressure influenced hand, spaced upturned ears on said direction indicating hand adapted alternately to be engaged in lagging position by said pressure influenced hand so that said direction indicating hand is carried by said pressure influenced hand, direction indicia between said ears denoting direction of movement of said pressure influenced hand, said ears being spaced to permit said pressure influenced hand to cover one of said indicia before engaging the opposed ear, while exposing the other of said indicia whereby the direction of movement of said pressure hand is revealed.

7. A barometer comprising a casing, a pressure operated hand mounted therein, a transparent cover and a balanced direction indicator mounted in said cover independently movable relative to said pressure operated hand, formed to extend under said pressure operated hand, and to be laggingly engaged by said pressure operated hand, signs on said direction indicator to denote the direction of movement of said pressure operated hand, said pressure operated hand covering one of said signs before engaging said direction indicator hand and simultaneously exposing the other sign whereby the direction of movement of said pressure operated hand is revealed.

8. In a pressure gauge, a pressure indicating hand, and means for determining the direction of pressure fluctuation including an independently movable arm engageable with said pressure indicating hand so as to travel with said hand, said arm having spaced opposed signs, one of which is adapted to be covered by said hand as it travels in one direction and the other to be covered as it travels in the opposite direction.

9. A barometer comprising a casing, a member mounted in said casing and bearing verbal guides, one interpretative of a falling pressure and the other interpretative of a rising pressure, a pressure operated hand, a direction indicator adapted to travel with said pressure operated hand and bearing pressure direction indicia readable with reference to said verbal guides, said direction indicator being so disposed relative to said pressure operated hand that said pressure operated hand at any one time covers one of said pressure direction indicia and discloses the other of said pressure direction indicia, the uncovered one of said pressure direction indicia identifying the verbal guide upon which is disclosed the interpretation of the disclosed barometric reading.

10. A barometer comprising a casing, a member mounted in said casing and bearing sets of verbal and colored guides, one of said sets being interpretative of a falling pressure and the other of said sets being interpretative of a rising pressure, a pressure operated hand, a direction indicator adapted to travel laggingly with said pressure hand and bearing pressure direction signs colored to be readable with reference to each set of said verbal and colored guides, said direction indicator being so disposed relative to said pressure hand that said pressure hand at any one time covers one of said direction signs and discloses the other of said signs, the uncovered sign identifying the verbal guide upon which is disclosed the interpretation of the disclosed barometric reading.

11. In a pressure gauge, a pressure indicating hand, means for determining the direction of pressure fluctuation including an independently movable hand adapted to be engaged by said pressure indicating hand so as to travel laggingly with said pressure indicating hand in trailed position, said independently movable hand having spaced signs denoting the direction of movement of said pressure indicating hand, and each of said signs being adapted to be covered by said pressure indicating hand depending on direction of movement thereof leaving the other sign in exposed position.

CLINTON F. HANSCOM.